United States Patent
Hülskemper

(10) Patent No.: US 7,590,436 B2
(45) Date of Patent: Sep. 15, 2009

(54) SLIDER MOBILE TELEPHONE COMPRISING A BENDING WAVE LOUDSPEAKER

(75) Inventor: Michael Hülskemper, Hünxe (DE)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 10/538,422

(22) PCT Filed: Nov. 13, 2003

(86) PCT No.: PCT/DE03/03775

§ 371 (c)(1), (2), (4) Date: Jun. 10, 2005

(87) PCT Pub. No.: WO2004/054317

PCT Pub. Date: Jun. 24, 2004

(65) Prior Publication Data

US 2006/0068858 A1    Mar. 30, 2006

(30) Foreign Application Priority Data

Dec. 12, 2002   (DE) ................ 102 58 183

(51) Int. Cl.
*H04B 1/38* (2006.01)

(52) U.S. Cl. .............. 455/575.4; 455/575.1; 455/575.3; 455/575.8

(58) Field of Classification Search .............. 455/575.1, 455/575.3, 575.4, 575.6, 575.8, 90.3, 128, 455/347

See application file for complete search history.

(56) References Cited

U.S. PATENT DOCUMENTS

| 5,883,966 | A | * | 3/1999 | Kubo | ................. 381/386 |
| 6,137,883 | A | | 10/2000 | Kaschke et al. | |
| 6,539,208 | B1 | * | 3/2003 | Mori | ............. 455/575.3 |
| 6,961,593 | B1 | * | 11/2005 | Lonka et al. | ........... 455/573 |
| 2003/0059069 | A1 | * | 3/2003 | Bank et al. | ........... 381/152 |
| 2004/0203496 | A1 | * | 10/2004 | Bae et al. | .......... 455/90.1 |

FOREIGN PATENT DOCUMENTS

| DE | 199 83 689 | | 2/2002 |
| EP | 0 792 055 | | 8/1997 |
| EP | 1 051 012 | | 11/2000 |
| EP | 1 150 476 | | 10/2001 |
| GB | 2 349 292 | | 10/2000 |
| JP | 09-205476 | * | 5/1997 |
| WO | WO 97/09856 | | 3/1997 |
| WO | WO 00/27041 | | 5/2000 |
| WO | WO 00/57615 | | 9/2000 |
| WO | WO 00/69212 | | 11/2000 |
| WO | WO 02/21881 | | 3/2002 |

* cited by examiner

Primary Examiner—Tuan A Pham
(74) Attorney, Agent, or Firm—K&L Gates LLP

(57) ABSTRACT

A mobile telephone equipped with a first and second housing parts, which can be displaced in relation to one another in such a way that sections of the housing part are exposed as a result of the displacement. One of the exposed sections is configured at least partially as a bending wave loudspeaker including a plate shaped element for emitting sound signals and an actuating element for exciting bending waves in the plate shaped element.

5 Claims, 1 Drawing Sheet

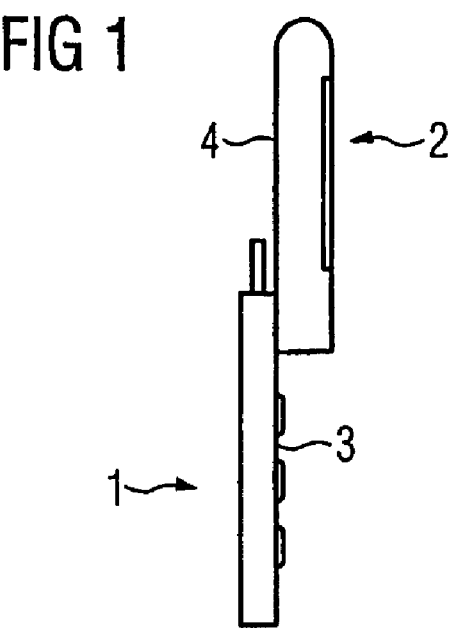
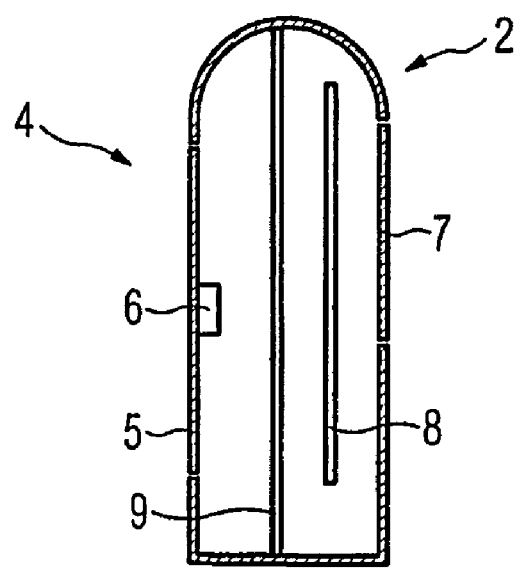

SLIDER MOBILE TELEPHONE COMPRISING A BENDING WAVE LOUDSPEAKER

FIELD OF THE INVENTION

The present disclosure relates to a mobile telephone which comprises a first and a second housing part which can be displaced with respect to one another in such a way that sections of the housing parts are exposed as a result of the displacement.

BACKGROUND

Such mobile telephones mentioned above are generally referred to is known as a "slider" mobile telephone, wherein the first and the second housing part can be displaced with respect to one another in the longitudinal direction of the mobile telephone. During this displacement, a keypad is exposed which allows a user of the mobile telephone to operate it. The keypad is usually located on the housing part of the mobile telephone which is at the rear in relation to the user. The front housing part of the mobile telephone has a fixed rear wall which has no function other than that of mechanically protecting the interior of the front housing part.

Mobile phones known in the art may also be equipped with a bending wave loudspeaker. In this case, a protective window over a display device of the mobile telephone, for example, is designed as a bending wave loudspeaker and is excited to produce bending vibrations by means of a piezo operating element. Since, in addition to its function as a bending wave loudspeaker, the protective window also has to assume the functions of mechanically protecting the interior of the mobile telephone and has to be transparent, the selection of materials for the protective window is limited and cannot be optimized, in particular for the function of the protective window as a bending wave loudspeaker.

BRIEF SUMMARY

Exemplary embodiments disclosed below disclose improved sound reproduction properties for a mobile telephone of the type mentioned in the background.

Under one such embodiment, one of the exposed sections of the phone is at least partially in the form of a bending wave loudspeaker comprising a plate-like element for emitting audible signals and an operating element for exciting bending waves in the plate-like element.

Improved sound reproduction properties of the mobile telephone are produced firstly by the fact that it is equipped with a bending wave loudspeaker, which to date has not yet been disclosed in the prior art for the slider mobile telephones disclosed herein. In addition, an exposed section of the mobile telephone is used to embody the bending wave loudspeaker. Under such a configuration, the mobile telephone will have relatively low requirements in terms of mechanical protection of the interior of the associated housing part of the mobile telephone. In this respect, the flat section of a housing part which forms the bending wave loudspeaker has considerably more degrees of freedom in terms of material selection compared to the prior art.

The bending wave loudspeaker can be formed by a flat section made of the same material as the material of the housing parts. The plate-like element in the exposed section is also preferably optimized for the purpose of excitation with bending vibrations. Irrespective of the material selected, the plate-like element is to be flexibly fixed to the associated housing part so that excitation with bending vibrations is possible. However, both the shape and material of the mobile telephone can be optimally selected on account of the chosen arrangement of the plate-like element of the bending wave loudspeaker.

A keypad of the mobile telephone can be arranged in the section of the first housing part which is exposed by the displacement, while the plate-like element of the bending wave loudspeaker can be arranged in the exposed section of the second housing part. Since, in order to have easy access to the keypad, a user holds the mobile telephone in such a way that the keypad is facing him, the exposed section of the second housing part, which comprises the plate-like element of the bending wave loudspeaker, faces away from the user. This has the advantage that sound is also emitted away from the user of the mobile telephone by means of the bending wave loudspeaker, so that when the mobile telephone is used in hands-free mode, in particular during transition from normal sound reproduction to hands-free reproduction, sudden increases in the intensity of sound do not directly affect the user. The risk of damage to the user's hearing on account of a transition of this kind is thus effectively avoided.

A separating wall can be provided between the plate-like element in the region of the exposed section of the second housing part and the interior of this housing part if increased mechanical protection or increased sealing against dust is desired.

The interior of the second housing part is mechanically protected when the separating wall in the interior of the second housing part, i.e., inward from the plate-like element, is arranged in such a way that on the one hand the plate-like element can execute the required buckling for the bending vibrations, but on the other hand cannot touch components which are against mechanical stress in the interior of the second housing part.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 1 shows a schematic side view of a slider mobile telephone, and

FIG. 2 shows a sectional view of a housing part of the slider mobile telephone according to FIG. 1.

DETAILED DESCRIPTION

The slider mobile telephone illustrated in the exemplary embodiment of FIG. 1 has a first housing part 1 and a second housing part 2 wherein each part can be displaced with respect to one another, in the longitudinal direction of the mobile telephone.

In FIG. 1, the first housing part 1 is displaced with respect to the second housing part 2 in such a way that the first housing part 1 exhibits an exposed section 3, in the region of which a keypad of the mobile telephone is arranged.

The second housing part 2 also has an exposed section 4, in the region of which a bending wave loudspeaker is accommodated which is formed by a plate-like element 5 and a piezo operating element 6 which excites the plate-like element 5 to produce bending vibrations so that the bending wave loudspeaker emits audible signals.

A display window 7, which is situated opposite the bending wave loudspeaker, is provided on an outer face of the second housing part 2.

On account of the provided arrangement of the plate-like element 5 of the bending wave loudspeaker, it emits sound away from a user of the mobile telephone.

It can be seen from the exemplary embodiment shown in FIG. 2 that the interior of the second housing part 2 contains a circuit board 8 which is to be protected against mechanical damage. For this reason, a separating wall 9 is arranged between the plate-like element and the circuit board 8, this separating wall being sufficiently mechanically stable and being fixed to an inner wall of the second housing part 2. The arrangement of the separating wall 9 is chosen such that the plate-like element 5 can execute the bending vibrations which are to be performed in order to emit sound over a desired frequency range.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A mobile telephone comprising:
   a first and a second housing part, wherein each housing part can be displaced by sliding with respect to one another in such a way that respective sections of each housing part are exposed as a result of the displacement, and wherein an exposed section of the second housing part comprises an internal acoustic area defined by a wall located within the second housing part that separates the acoustic area from the remainder of the second housing part;
   a keypad located in the first housing part; and
   a bending wave loudspeaker comprising a plate-like element in the exposed section on a rear of the second housing part for emitting audible signals and an operating element for exciting bending waves in the plate-like element, wherein the bending wave loudspeaker and operating element are located on an outside surface of the acoustic area that faces away from a user and the bending wave loudspeaker travels on a path that is parallel to the keypad when each housing part is displaced by sliding.

2. The mobile telephone as claimed in claim 1, wherein a material for the plate-like element is optimized for the purpose of excitation with bending vibrations.

3. The mobile telephone as claimed in claim 1, further comprising a keypad arranged in the section of the first housing part that is exposed by the displacement, and the plate-like element of the bending wave loudspeaker is arranged in the exposed section of the second housing part.

4. The mobile telephone as claimed in claim 1, wherein the wall mechanically protects the interior of the second housing part against buckling of the plate-like element.

5. The mobile telephone as claimed in claim 1, wherein the bending wave loudspeaker is in a fixed position relative to the keypad.

* * * * *